(12) United States Patent
Falken

(10) Patent No.: US 9,828,517 B2
(45) Date of Patent: *Nov. 28, 2017

(54) SEED-CONTAINING CRAYON

(71) Applicant: Effekt LLC, Solana Beach, CA (US)

(72) Inventor: Robert Falken, Oceanside, CA (US)

(73) Assignee: EFFEKT, LLC, Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/393,167

(22) Filed: Dec. 28, 2016

(65) Prior Publication Data

US 2017/0107392 A1    Apr. 20, 2017

Related U.S. Application Data

(63) Continuation of application No. 14/513,166, filed on Oct. 13, 2014, now Pat. No. 9,534,131.

(60) Provisional application No. 61/890,124, filed on Oct. 11, 2013.

(51) Int. Cl.

| | |
|---|---|
| C09D 13/00 | (2006.01) |
| C05G 3/00 | (2006.01) |
| A01C 1/04 | (2006.01) |
| B43K 19/02 | (2006.01) |
| B43K 19/14 | (2006.01) |
| B43K 19/16 | (2006.01) |
| B43K 19/18 | (2006.01) |
| B43K 29/00 | (2006.01) |

(52) U.S. Cl.
CPC .............. *C09D 13/00* (2013.01); *A01C 1/046* (2013.01); *B43K 19/02* (2013.01); *B43K 19/14* (2013.01); *B43K 19/145* (2013.01); *B43K 19/16* (2013.01); *B43K 19/18* (2013.01); *B43K 29/00* (2013.01); *C05G 3/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,528,774 A | * | 7/1985 | Skaife | A01G 9/02 47/81 |
| 6,110,501 A | * | 8/2000 | Redding, Jr. | A61K 9/2081 424/490 |
| 2015/0202914 A1 | * | 7/2015 | Bollini | A01C 1/04 47/58.1 SE |

\* cited by examiner

*Primary Examiner* — David Walczak
(74) *Attorney, Agent, or Firm* — Mintz Levin Cohn Ferris Glovsky and Popeo, P.C.

(57) ABSTRACT

A seed-containing crayon. The crayon includes an elongated member formed of a marking composition to leave a colored mark on a surface when the elongated member contacts the surface. The marking composition is formed of a wax, a pigment, and a plant nutrient that is activated by application of water to the elongated member. Plant seeds are embedded in the marking composition of the elongated member. The crayon can include a paper band that at least partially surrounds the elongated member along at least part of the length of the elongated member in which the plant seeds are embedded.

19 Claims, 1 Drawing Sheet

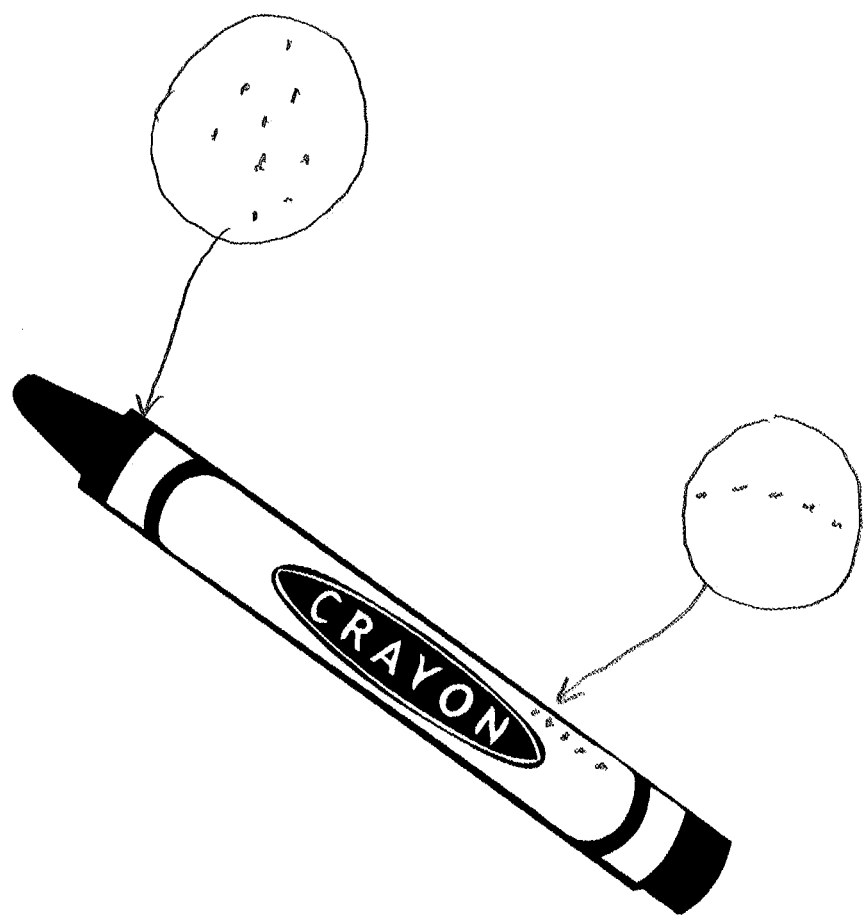

SEED-CONTAINING CRAYON

CROSS REFERENCE TO RELATED APPLICATIONS

This application claims the benefit of priority of U.S. Non-Provisional application Ser. No. 14/513,166, filed Oct. 13, 2014, now U.S. Pat. No. 9,534,131 titled "Seed-Containing Crayon", which claims the benefit of priority under 35 U.S.C. §119(e) of U.S. Provisional Application Ser. No. 61/890,124, filed Oct. 11, 2013, titled "Seed-Containing Crayon," the disclosure of which is hereby incorporated by reference in its entirety herein.

BACKGROUND

Crayons are a ubiquitous toy or coloring implement. Kids write and draw with crayons for fun. However, the vast majority of crayons become broken or merely discarded well before they can be completely used up. Typically, broken or discarded crayons are disposed of in the trash, which typically ends up in landfills. Millions, if not billions, of crayons are discarded every year in this manner.

SUMMARY

This document describes an enhanced crayon that includes usefulness beyond a coloring implement. In one aspect, a crayon containing plant or flower seeds is disclosed. The seeds can be embedded directly into the crayon material, which is typically a wax while in other implementations the seeds can be provided between the crayon material and a wrapper placed around at least part of the crayon.

The seed-containing crayon can be placed in the ground at any time, whether the crayon is broken or partially used or not, such that the crayon acts as a vehicle for containing the seed until it germinates and/or grows.

In one aspect, a seed-containing crayon is disclosed. The crayon includes an elongated member formed of a marking composition to leave a colored mark on a surface when the elongated member contacts the surface. The marking composition is formed of a wax, a pigment, and a plant nutrient that is activated by application of water to the elongated member. Plant seeds are embedded in the marking composition of the elongated member. The crayon can include a paper band that at least partially surrounds the elongated member along at least part of the length of the elongated member in which the plant seeds are embedded.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 1 illustrates a seed containing crayon.

Like reference symbols in the various drawings indicate like elements.

DETAILED DESCRIPTION

This document describes a seed-containing crayon or set of crayons. In some implementations, small seeds are embedded into a wax formulation or marking composition that makes up the crayon, preferably as the wax formulation or marking composition is in a liquid phase prior to hardening and being formed into an elongated member of the crayon. Essentially, a crayon composition is disclosed that readily releases the seeds contained therein. One method of achieving this is forming a washable crayon composition so that once the crayon is moistened in the ground, the seeds release. All ingredients referenced above are miscible in water and therefore soften and "wash away".

In preferred implementations, a biodegradable soy wax composition is used for the basis of the ideal crayon wax formula. The soy wax is of a renewable resource and can be more environmentally degraded due in part to the non-complex nature of the wax. Paraffin wax by contrast, is what most typical crayons are made from currently. It is known that paraffin is a non-renewable resource and does not degrade easily or in short periods of time. The preferred soy wax of this implementation may contain any number of small seeds that are homogenized into the finished crayon. The seeds may be included directly into the crayon formula, or embedded on the surface of the crayon once the crayon is formed. Once the seed-embedded crayon is placed in the ground or nutrient-rich soil the seeds will germinate and plants or flowers will grow from the seeds.

The composition of the crayon includes renewable or natural matter. For instance, the composition can be polyethelene glycol derived from sugar cane waste from about 30% to about 50% by weight. Alternatively, ethoxylated stearic acid may be used. In other implementations, stearyl alcohol, a pure and natural fatty alcohol from the fatty acid of coconut oil can be used, from about 30% to about 50% by weight. The crayons can include extended pigments, e.g., AAA pigments, for example, acetoacetanilide pigments, from about 1% to about 6% by weight. All ingredients referenced above are miscible in water and therefore soften and "wash away" when the crayon is planted in the ground and watered.

In some implementations, the seeds are embedded in the formulation without interruption to the crayon's functional drawing ability. The formula is preferably safe and non-toxic for children to eat in the event that a child attempts to consume the crayon. In addition to soy wax, any biodegradable wax composition may be used to create the crayon. Additionally, any type of seed may be used, whether an annual or perennial seed.

In alternative implementations, the paper banding on the crayon is made of a nutrient rich material for aiding seeds' growth. For example, the paper band can be impregnated with very small seeds. Or, the band can be formed of a substrate such as paper or other fiber, which can then include any of various seed-feeding nutrients. Once the seed-containing crayon paper band is moistened and placed in the ground it will readily germinate and plants or flowers will grow. Additionally, the paper banding can be water-soluble so as to further aid in the germination process.

In yet another implementation, the seeds can be matched to a particular color of crayon based on the eventual plant or flower that will grow from the seeds. For instance, seeds of various colored flowers can be matched or otherwise associated with particular colors of crayons, to provide a crayon set that can grow various associated colors of flowers or plants.

The crayons can be any size or shape, and can be packaged individually or in sets or groups. Further, a set of crayons can have any number of colors, shades or hues. In some implementations, the seeds can be provided to a small section of the crayon, while in other implementations the seeds can be concentrated in one or more areas, or evenly distributed throughout the body of the material of the crayon.

Although a few embodiments have been described in detail above, other modifications are possible. Other embodiments may be within the scope of the following claims.

The invention claimed is:

1. A seed-containing crayon comprising:
   an elongated member formed of a marking composition to leave a colored mark on a surface when the elongated member contacts the surface, the marking composition comprising a wax, and a pigment;
   a plurality of plant seeds embedded in the marking composition of the elongated colored member; and
   a paper band that at least partially surrounds the elongated member along at least part of the length of the elongated member in which the plurality of plant seeds are embedded.

2. The seed-containing crayon in accordance with claim 1, wherein the wax includes stearyl alcohol from about 30 percent to about 50 percent by weight of the crayon.

3. The seed-containing crayon in accordance with claim 1, wherein the wax includes polyethelene glycol from about 30 percent to about 50 percent by weight of the crayon.

4. The seed-containing crayon in accordance with claim 1, wherein the plurality of seeds are embedded in an outer surface of the elongated member and covered by the paper band.

5. The seed-containing crayon in accordance with claim 1, wherein the paper band includes a plant nutrient that is activated by application of water to the paper band.

6. The seed-containing crayon in accordance with claim 1, wherein the plurality of seeds are mixed in with the marking composition.

7. A method comprising:
   embedding a plurality of plant seeds in a marking composition, the marking composition comprising a wax and a pigment;
   forming an elongated member out of the marking composition to leave a colored mark on a surface when the elongated member contacts the surface;
   surrounding the elongated member with a paper band along at least part of the length of the elongated member in which the plurality of plant seeds are embedded.

8. The method in accordance with claim 7, wherein the wax includes stearyl alcohol from about 30 percent to about 50 percent by weight of the elongated member.

9. The method in accordance with claim 7, wherein the wax includes polyethelene glycol from about 30 percent to about 50 percent by weight of the elongated member.

10. The method in accordance with claim 7, wherein the plurality of seeds are embedded in an outer surface of the elongated member and covered by the paper band.

11. The method in accordance with claim 7, wherein the paper band includes a plant nutrient that is activated by application of water to the paper band.

12. The method in accordance with claim 7, wherein embedding the plurality of seeds includes mixing the plurality of seeds with the marking composition.

13. A seed-containing crayon comprising:
    an elongated member formed of a marking composition to leave a colored mark on a surface when the elongated member contacts the surface, the marking composition comprising a wax and one or more pigments; and
    a plurality of plant seeds embedded in the marking composition of the elongated member.

14. The seed-containing crayon in accordance with claim 13, further comprising a band that at least partially surrounds the elongated member along at least part of the length of the elongated member in which the plurality of plant seeds are embedded.

15. The seed-containing crayon in accordance with claim 13, wherein the wax includes stearyl alcohol from about 30 percent to about 50 percent by weight of the crayon.

16. The seed-containing crayon in accordance with claim 13, wherein the wax includes polyethelene glycol from about 30 percent to about 50 percent by weight of the crayon.

17. The seed-containing crayon in accordance with claim 13, further comprising a paper band around the elongated member, wherein the plurality of seeds are embedded in an outer surface of the elongated member and covered by the paper band.

18. The seed-containing crayon in accordance with claim 17, wherein the paper band is formed of paper and a plant nutrient that is activated by application of water to the paper band.

19. The seed-containing crayon in accordance with claim 13, wherein the plurality of seeds are mixed in with the marking composition.

* * * * *